United States Patent [19]

Chung

[11] Patent Number: 4,488,282
[45] Date of Patent: Dec. 11, 1984

[54] DAMPING MATERIAL

[75] Inventor: Kwong T. Chung, Hopewell Township, Mercer County, N.J.

[73] Assignee: RCA Corporation, New York, N.Y.

[21] Appl. No.: 545,735

[22] Filed: Oct. 26, 1983

[51] Int. Cl.³ .............................................. G11B 3/44
[52] U.S. Cl. .................................. 369/135; 369/132; 523/428
[58] Field of Search ............... 369/247, 139, 132, 244, 369/170, 292, 135, 137

[56] References Cited

U.S. PATENT DOCUMENTS 4,035,590 7/1977 Halter .................. 179/100.41 P
4,258,593 3/1981 Oinonen ......................... 83/835
4,304,694 12/1981 Scola et al. ..................... 523/428

FOREIGN PATENT DOCUMENTS 1125180 1/1982 Canada.

OTHER PUBLICATIONS

Lee et al, Handbook of Epoxy Resins; McGraw-Hill Book Co.; 1967; pp. 10–12, 14–2.
"Epon/Eponol Resins", Product Specification Guide, Shell Chemical Company.

Primary Examiner—Lewis T. Jacobs
Attorney, Agent, or Firm—Birgit E. Morris; Edward J. Sites

[57] ABSTRACT

A cured multi-component epoxy composition made from a high molecular weight diglycidyl ether of bisphenol A, a second diglycidyl ether, a high molecular weight polyamide-amine curing agent, and an accelerator, is an excellent damping material and can be used in a cutterhead assembly for the manufacture of high-density information discs.

6 Claims, 3 Drawing Figures

DAMPING MATERIAL

This invention provides an improved epoxy damping material which is operative over a wide range of temperatures.

BACKGROUND OF THE INVENTION

In the manufacture of high-density information records, a diamond cutterhead assembly is used to cut a surface relief pattern, including information bits and tracking aids, into a metallic recording substrate. The cutterhead assembly includes a diamond stylus, a piezoelectric element and a pedestal member which is attached to a mounting bracket by means of a damping material.

As disclosed in U.S. Pat. No. 4,035,590 to Halter, herein incorporated by reference, damping is provided by a rigid member made, for example, of Kapton, a plastic available from the DuPont Company, and one or more pliable layers contacting the rigid member which are made of a silicone rubber or a cellulosic material such as Viscoloid, available from American Viscose Company. This structure serves to attenuate and therefore inhibit reflection of the propagating waves generated by the piezoelectric element and also serves to de-couple the moving portion of the cutterhead from the resonant modes within the cutterhead assembly support.

The above cutterhead assembly has been successfully used to cut recording substrates at one-half real time, that is, the recording is made at one-half the speed at which the record will be played back. Since recording at real time rates obviously represents a major saving in recording time and would result in substantial cost savings for manufacturing records, attempts have been made to record at real time. Recording at real time increases the speed of cutting and therefore the temperatures generated during recording. The heat which is transmitted to the cutterhead assembly is greatly increased, with temperatures being generated up to 150° C. or even higher.

The damping materials used heretofore are inadequate at such high temperatures. Viscoloid, for example, is a solvent-based material that melts at such temperatures and thus is dimensionally unstable for real time recording. Other materials that have been tried, such as commercially available epoxy resins cured at room temperature, which when exposed to the higher temperatures, continue to cross-link thereby changing the damping character of the materials over a wide temperature range.

Other stringent criteria exist for a good damping material for this application. In addition to dimensional and damping stability at elevated temperatures, the damping material must be flexible over a whole range of temperatures from room temperature to over 150° C. Another criteria is that the material be flexible, i.e., have a $T_g$, below room temperature. In addition, the material must be able to damp over a wide range of temperatures and thus must have a high thermal conductivity, because at the same time that the air-material interface is at room temperature, the material-piezoelectric interface may be as high as about 150° C. Also the material must be stable with respect to time as well as to temperature.

Thus since real time recording would result in a substantial cost savings, a search for a damping material effective and stable over a wide range of temperatures has continued.

SUMMARY OF THE INVENTION

Figure 1:
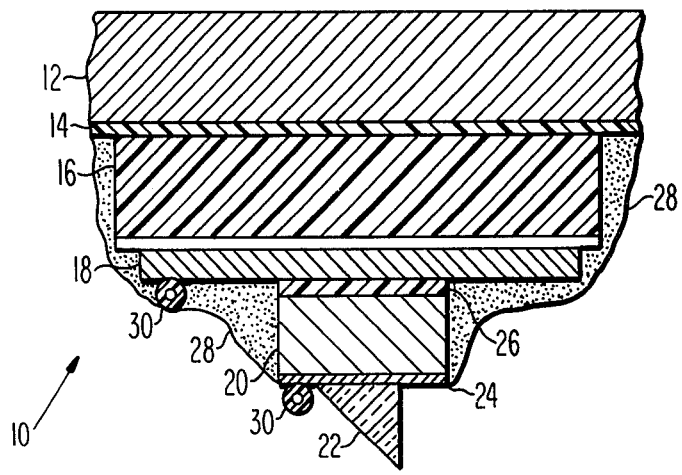
FIG. 1 illustrates a cross-sectional view of a cutterhead assembly employing the damping material of the invention.

I have found that a cured, multi-component epoxy composition made from a high molecular weight diglycidyl ether of bisphenol A, a second glycidyl ether having a different activation energy for its molecular structural mobility, a high molecular weight polyamideamine curing agent and an accelerator, which has a suitable viscosity, is an excellent damping material and can be used in a cutterhead assembly for real time recording.

DETAILED DESCRIPTION OF THE INVENTION

The diglycidyl ether of bisphenol A has the formula

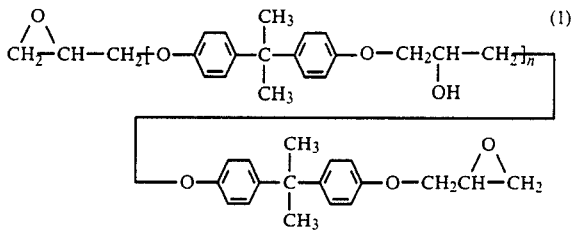

In the present application the average value of n should be about one.

The second resin component is a diglycidyl ether of a long chain dimer acid, such an linoleic acid, which has the general formula

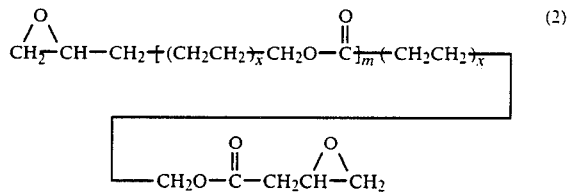

wherein x and m combined are adjusted so that the epoxy equivalent weight is about 300–500.

Epoxy compositions made from the above mixture produce epoxies with long segmented chains between cross-linked sites in the epoxy resin to give a flexible network. The relative proportions of the bisphenol A compound and the long chain acid compound can be varied from about 100 to 200 parts by weight of the dimer compound to 100 parts by weight of the bisphenol A compound. The long chain alkyl group of the acid component imparts flexibility to the cured cross-linked resin and thus higher amounts of the long chain acid glycidyl ether imparts greater flexibility and damping ability to the cured epoxy composition.

The curing agent should be an elevated temperature curable amine, such as a polyamide-amine, preferably of relatively high molecular weight. The curing agent can be present in amounts of from about 20 to about 250 parts by weight of the curing agent per 100 parts by weight of the resin component. Increasing amounts of the hardener will in general increase the flexibility and damping ability of the final cross-linked resin.

A minor amount of an accelerator, such as dibenzyl dimethyl amine, is also added to the curing agent. The accelerator acts to open the epoxy groups during curing so as to provide a more fully cured epoxy resin. Thus a suitable amount of the accelerator should be sufficient to ensure that reaction is complete so that further reaction or curing does not occur with time, to prevent change in the cured epoxy characteristics. In the absence of an accelerator, a hard, rigid skin forms on the epoxy, lessening its damping ability, when held at an elevated temperature such as 125° C. or higher.

In addition to the above, various fillers, pigments and the like can also be added. Desirably the composition contains from about 1% to 5% by weight of a filler such as finely divided silica to thicken the resin. For the present damping system, the damping composition should be liquid, but thick enough so that it will not drip prior to curing.

In addition, a pigment such as carbon black or titanium dioxide in minimum amounts, e.g., about 1% to 5% by weight of the resin component, can be added. A thermally conductive filler can be added to improve the heat loss characteristics of the cured compositon.

The damping composition is prepared by adding the fillers, pigments and the like to a solution of the diglycidyl ether components. Since the diglycidyl ethers have a comparatively high molecular weight, they may be warmed to reduce their viscosity while mixing them together to ensure a homogeneous solution. The hardener and accelerator are mixed together separately and then the two solutions are stirred together.

After application to the assembly to be damped, such as a cutterhead assembly described more fully hereinbelow, the composition is cured. Curing can take place at room temperature or it can be cured at elevated temperatures of from about 125°-150° C.

The invention will be further described with reference to the Drawing. FIG. 1 illustrates an electromechanical cutterhead assembly 10 in which the above-described epoxy damping composition is useful. The cutterhead assembly 10 includes a mounting support 12, bonded by means of an adhesive layer 14 to an isolation pad 16. A conductive pedestal 18 supports a piezoelectric element 20 having a diamond stylus 22 mounted thereon. The piezoelectric element 20, which can be made of lead zirconium titanate ceramic, for example, is adhered to the stylus 22 by means of a non-conductive epoxy resin layer 24. A second, conductive, epoxy resin layer 26 adheres the piezoelectric element 20 to the conductive pedestal 18, which can be a plate of steel or tungsten. The isolation pad 16 is made of a material that is electrically insulating, heat-conducting and mechanically isolating and can be a silicone-based or epoxy-based resin. A suitable silicone-based resin is commercially available under the tradename Silpad from the Bergquest Company. The isolation pad 16 is adhered to the steel mounting support 12 by an epoxy adhesive. In one embodiment of the invention, the damping epoxy layer 28 of the invention surrounds the piezoelectric element 20, the steel pedestal 18 and the isolation pad 16. Electrical leads 30 energize the cutterhead and complete the assembly.

The invention will be further described in the following example. In the example parts and percentages are by weight unless otherwise noted.

EXAMPLE

Fifty parts of the diglycidyl ether of bisphenol A having a viscosity of about 110-115 poises measured according to ASTM test D445 and an epoxide equivalent of about 185-192 (ASTM D1652) which corresponds to a molecular weight of about 370-384, was combined with 50 parts of the diglycidyl ether of linoleic acid dimer resin having a viscosity of 4-9 poises and an epoxide equivalent of 390-470, corresponding to a molecular weight of about 780-940. Three parts of silica powder and four parts of titanium dioxide pigment were added to the resin component.

A hardener portion was prepared from 100 parts of polyamide-amine sold as Epon V-40 by the Shell Company having an epoxide equivalent weight of 140 and an amine value of 370-400 and one part of benzyl dimethyl amine.

The two mixtures were combined in a ratio of 100 parts of the resin component and 225 parts of the hardener component. The mixture was a thick liquid.

The resin was applied to the outside of an assembled cutterhead as in FIG. 1 so that it surrounded the piezoelectric element and the isolation pad up to the support. The assembly was placed in an oven at between 125°-150° C. for 16 hours to cure.

The damping composition as made and cured above had a $T_g$ of 0° C. and excellent damping quality. The modulus at 20° C. and 10 hertz was $5 \times 10^7$ dynes/cm$^2$ and at 40°-150° C. and 10 hertz was $2 \times 10^6$ dynes/cm$^2$. Thus the modulus varied little with temperature.

The damping quality is excellent with tangent delta being between 0.8 and 1 at temperatures between 20° C. and up to 150° C. Thus the damping quality remains at a very high level throughout the temperature range of interest.

Figure 2:
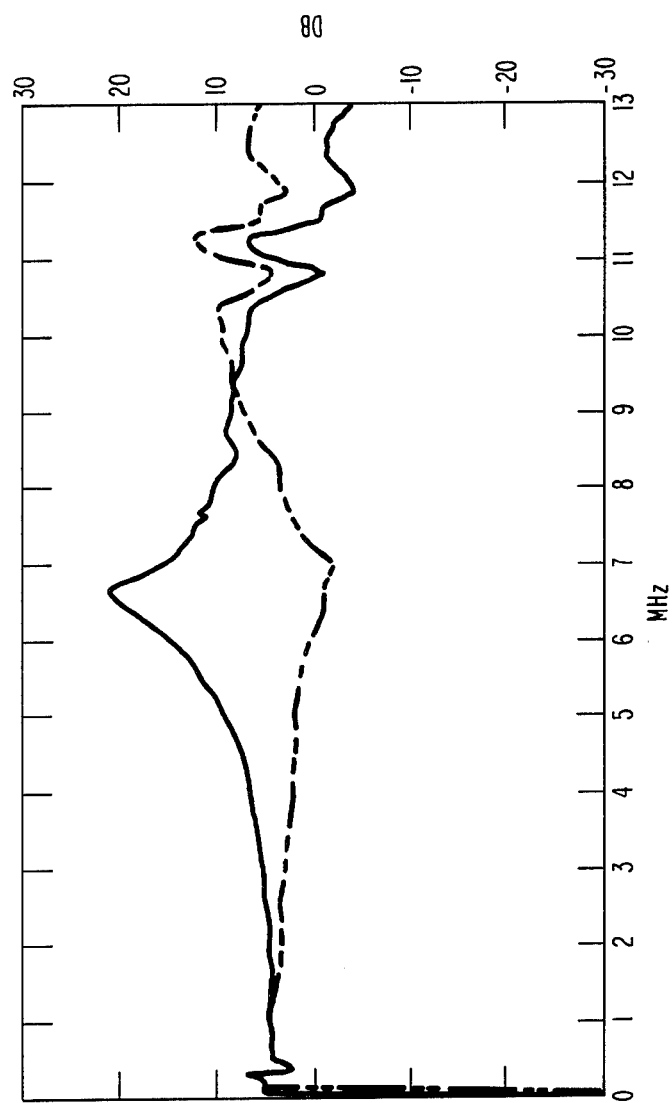
FIGS. 2 and 3 are graphs of stylus displacement versus frequency of a test signal generated by a cutterhead assembly without and with the damping epoxy composition of the invention, respectively.
Figure 3:
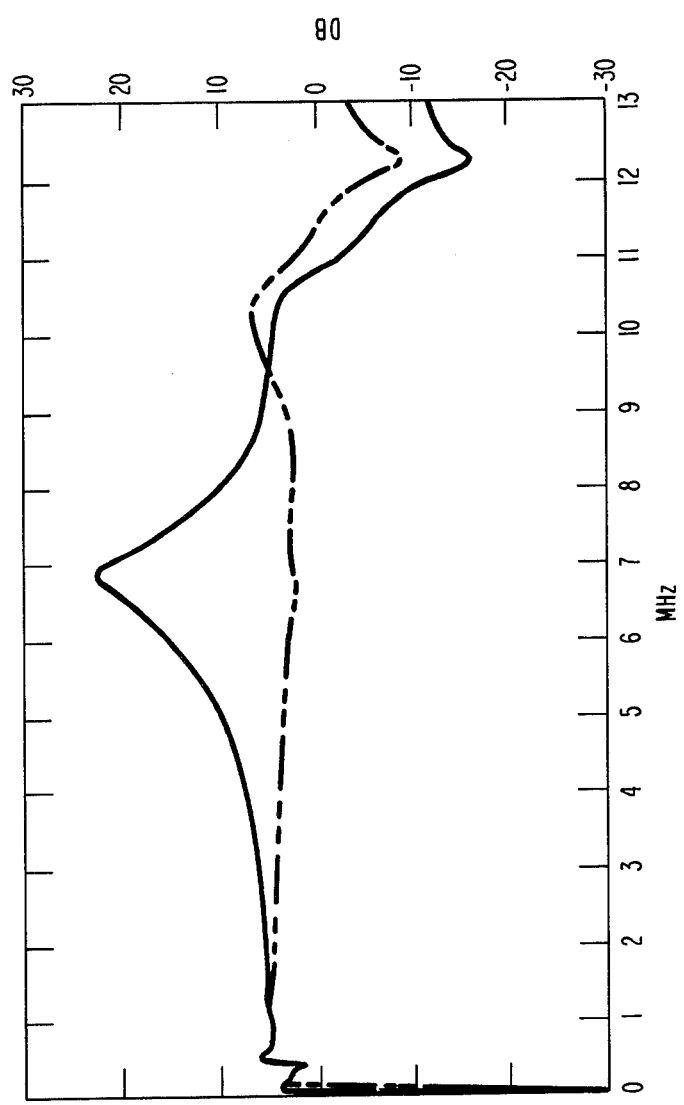

FIGS. 2 and 3 are graphs of frequency versus displacement in the "Z" direction (up and down) of the cutterhead stylus. A one volt RMS signal was applied to the cutterhead and displacement of the stylus in the "Z" direction measured. The graph of FIG. 2 obtained with a stylus assembly as described in FIG. 1 except without using the damping epoxy composition of this invention shows a rather erratic displacement of the stylus with changes in amplitude.

The graph of FIG. 3 shows the displacement obtained with the cutterhead assembly stylus of this invention with the damping epoxy composition present. It can be seen that the displacement traces a much smoother line than in FIG. 2, indicating effective damping of the stylus assembly.

I claim:

1. In a cutterhead assembly comprising a cutting stylus adhered to a piezoelectric element surrounded with a damping material attached to a pedestal and an electrically insulating support, the improvement which comprises using as the damping material a material which is a cured epoxy composition derived from a resin component and a hardener component, wherein the resin component contains a high molecular weight diglycidyl ether of bisphenol A and a diglycidyl ether of a long chain dimer acid and the hardening component comprises a polyamide-amine curing agent and an accelerator and wherein the percent by weight of the hardener component is higher than that of the resin component.

2. An assembly according to claim 1 wherein the resin component contains from 100 to 200 parts by weight of the dimer acid compound per 100 parts by weight of the bisphenol A compound.

3. An assembly according to claim 1 wherein the dimer acid compound is the diglycidyl ether of linoleic acid dimer.

4. An assembly according to claim 1 wherein the resin component contains from one to five parts by weight of filler particles per 100 parts by weight of the resin component.

5. An assembly according to claim 1 wherein the composition contains from one to five parts by weight of pigment particles per 100 parts by weight of the resin component.

6. An assembly according to claim 1 wherein the accelerator is dibenzyl dimethyl amine.

* * * * *